(12) United States Patent
Wu et al.

(10) Patent No.: US 7,698,466 B2
(45) Date of Patent: Apr. 13, 2010

(54) TRANSFERRING METHOD OF SUBSCRIBER LOCATION INFORMATION IN A NETWORK COMMUNICATION SYSTEM

(75) Inventors: Haijun Wu, Shenzhen (CN); Xiaolin Xu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 49 days.

(21) Appl. No.: 10/555,722

(22) PCT Filed: Mar. 1, 2004

(86) PCT No.: PCT/CN2004/000156

§ 371 (c)(1),
(2), (4) Date: Nov. 7, 2005

(87) PCT Pub. No.: WO2004/066589

PCT Pub. Date: Aug. 5, 2004

(65) Prior Publication Data

US 2006/0253530 A1    Nov. 9, 2006

(30) Foreign Application Priority Data

May 7, 2003    (CN) .............................. 03122892.5

(51) Int. Cl.
*G06F 15/16* (2006.01)
(52) U.S. Cl. ................................... 709/246
(58) Field of Classification Search ............... 709/223, 709/245, 246; 707/10; 375/222, 257
See application file for complete search history.

(56) References Cited

U.S. PATENT DOCUMENTS

| 5,179,555 A * | 1/1993 | Videlock et al. ........... 370/402 |
| 6,167,058 A * | 12/2000 | Ward et al. ................ 370/445 |
| 6,445,709 B1 * | 9/2002 | Chiang ....................... 370/399 |
| 6,457,061 B1 * | 9/2002 | Bal et al. .................... 709/245 |
| 6,477,595 B1 * | 11/2002 | Cohen et al. ................ 710/105 |
| 6,675,208 B1 * | 1/2004 | Rai et al. .................... 709/224 |
| 2003/0165230 A1 * | 9/2003 | Reuss ..................... 379/265.02 |
| 2004/0141468 A1 * | 7/2004 | Christensen et al. ........ 370/252 |
| 2006/0155853 A1 * | 7/2006 | Nesz et al. ................. 709/227 |

FOREIGN PATENT DOCUMENTS

WO   WO 2004066589 A1   5/2004

OTHER PUBLICATIONS

European Search Report From European Application No. EP 04 71 5867, dated Sep. 6, 2006.

(Continued)

*Primary Examiner*—Hassan Phillips
*Assistant Examiner*—Imad Hussain
(74) *Attorney, Agent, or Firm*—Conley Rose, P.C.; Grant Rodolph (57) ABSTRACT

A method for transferring subscriber location information in a network communication system, including: converting the accessed subscriber location information into a code in the encoding format of the corresponding field in a subscriber packet to be sent outwards by the subscriber, carrying the code in the subscriber packet, and transferring the packet in the network communication system. It is also provided a method for converting MAC address, including: a network access device generating an MAC address from an MAC address resource pool; and replacing the source MAC address in a packet from a subscriber with said generated MAC address. The methods are no longer restricted by the number of permitted VLAN IDs in the network, and thereby improve feasibility of subscriber location information acquisition, providing a convenience for network operators to implement relevant extended services in network communication systems.

13 Claims, 3 Drawing Sheets

OTHER PUBLICATIONS

"Handling Local Administered Media Access Control Addresses in LAN Interconnect," IBM Technical Disclosure Bulletin, Apr. 4, 1993, pp. 185-188, Armonk, NY, US.

"IEEE Standard for Local and Metropolitan Area Networks: Overview and Architecture," IEEE Standards Mar. 8, 2002, pp. i-ix, 1-36, The Institute of Electrical and Electronics Engineers, Inc., 3 Park Avenue, New York, NY 10016-5997, USA.

Ilija Hadžić, "Hierarchical MAC Address Space in Public Ethernet Networks," IEEE, 2001, pp. 1563-1569.

* cited by examiner

TRANSFERRING METHOD OF SUBSCRIBER LOCATION INFORMATION IN A NETWORK COMMUNICATION SYSTEM

CROSS REFERENCE TO RELATED APPLICATIONS

This application is the U.S. national phase application of PCT Application No PCT/CN2004/000156 filed Mar. 1, 2004 and entitled "A Transferring Method Of Subscriber Location Information In A Network Communication System," which claims priority to Chinese application No. 03122892.5, filed on May 7, 2003 with the State Intellectual Property Office of the People's Republic of China, entitled "A Transferring Method Of Subscriber Location Information In A Network Communication System".

FIELD OF THE INVENTION

The present invention relates to a technical field of network communication, particularly to a method for transferring subscriber location information in a network communication system.

BACKGROUND OF THE INVENTION

To facilitate network operation management, different kinds of authentication modes for access subscribers are widely used in networks. Presently, in networks that provide access service through ADSL (Asymmetric Digital Subscriber Line), VDSL (Very High Bit Rate Digital Subscriber Line), FE (Fast Ethernet), or G.shdsl (Single-Pair High-Speed Digital Subscriber Line), usually PPPoE (Point to Point Protocol over Ethernet), 802.1x, Web (World Wide Web) authentication, and DHCP+ (DHCP: Dynamic Host Configuration Protocol) authentication modes, etc., are used. In those authentication modes, authentication request messages sent from subscriber ends are processed by an access server, which obtains subscriber identity and location information, i.e., the access server also obtains subscriber location information besides obtaining subscriber account and password information for identity authentication from the request messages through authentication messages based on the above authentication protocols, so as to implement extended service features when performing local and Radius (remote) authentication and accounting according to the subscriber location information; said location information comprises port number and slot number of the network access device where the subscriber accesses; said extended service features comprise: restricting the subscriber related to a specific account to access the network via only one single subscriber access port through binding subscriber account and location information, providing the subscriber with a private line access network; providing a function of tracking down to a physical port according to the subscriber location information.

Therefore, in order to implement extended service features in the network communication system, not only subscriber identity information but also subscriber location information needs to be transferred in the network communication system. Hereunder the currently used method for transferring subscriber location information in a network communication system is introduced.

Figure 1:
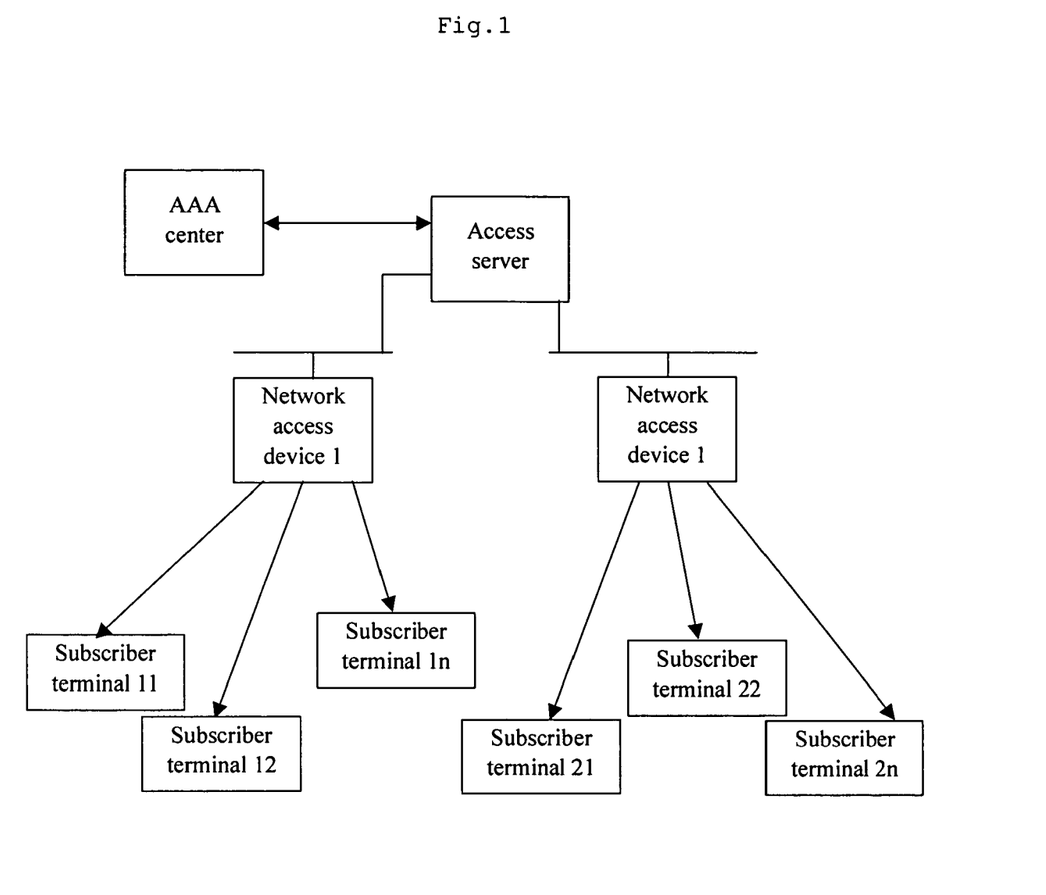
FIG. 1 is a schematic diagram of network structure of a network communication system.

In a broadband network communication system, subscriber location information is transferred mainly through VLAN (Virtual Local Area Network) protocol specified in IEEE 802.1Q (IEEE: Institute of Electrical and Electronics Engineers). This may comprise establishing the correspondence between location information (subscriber access port information or PVC (Permanent Virtual Connection) ID information, etc) and subscriber VLAN ID (Virtual LAN Identifier). The network structure of a typical broadband network is shown in FIG. 1. When a subscriber connected with a network access device accesses the network, it sends an authentication request message carrying its own VLAN ID and identity information to the access server. The access server receives the authentication request message and communicates with the Authentication, Authorization and Accounting Center to authenticate an identity of the accessed subscriber. At the same time, the access server determines the subscriber location information according to the VLAN ID information in the message and the establishes correspondence between the VLAN ID and the subscriber location information, by determining a device ID of the network access device where the subscriber accesses as well as the slot number and port number of the subscriber's access card accessing the network access device according to the access subscriber's VLAN ID, so as to obtain the location information of the accessed subscriber in the access network.

With the above technical solution, the access server in the network communication system can obtain the subscriber location information in the access network successfully, so as to implement corresponding extended service features. However, as the network communication technology develops and the network structure becomes increasingly complex, the disadvantages of foresaid method of obtaining accessed subscriber location information becomes more and more obvious. A premise for implementing the existing technical solution is: enough VLAN ID resource should be provided in the network; however, as specified in IEEE802.1Q protocol, there are at most 4096 VLAN IDs in the entire L2 network; therefore, the access server has to be connected directly with the network access devices, so that each port in the access server is a L3 port and has 4096 VLAN IDs, in order to meet the demands of applications.

However, usually there are convergence devices between the access server and the network access devices in networking applications, for example, when there are network convergence devices such as L2 and L3 switches between the access server and subscribers, the subscribers converged to the intermediate L2 and L3 switches usually exceed 4K, as the consequence, the permitted VLAN IDs in the network can't meet the requirement. Therefore, the above technical solution of obtaining subscriber location information on the basis of VLAN IDs are unable to implement. Furthermore, the higher the access server's position in the network is, the more the convergence devices between the access server and the network access devices will be, and thereby the more severe the problem of insufficient VLAN IDs will be.

In addition, even though the network access devices are connected directly to the access server in the network, often, a plurality of network access devices have to be cascaded and then connected with the access server in actual network, resulting in the number of subscribers connected with the access server exceeds 4096; in this case, there is still the problem of insufficient VLAN IDs.

Therefore, the technical solution of obtaining subscriber location information by the access server in the prior art is increasingly unable to meet the demand of obtaining location information, due to its constraint in permitted VLAN IDs in the network.

SUMMARY OF THE INVENTION

In view of above problems in the prior art, an object of the present invention is to provide a method for transferring subscriber location information in a network communication system, so as to overcome the limitation of number of permitted VLAN IDs in the network in subscriber location information acquisition in the network communication system.

The object of the present invention is achieved with the following solution:

A method for transferring subscriber location information in a network communication system, comprising:

determining the subscriber location information when a subscriber accesses the network;

the network access device converting the accessed subscriber location information into a code in the encoding format of the corresponding field in a packet to be sent outwards by the subscriber;

the network access device receiving a packet sent from the subscriber, replacing the corresponding field in the packet with the determined subscriber location information code, and transferring the packet in the network communication system.

Said accessed subscriber location information comprises:

network access device ID in the network accessed by the subscriber, slot number of the subscriber interface board in the network access device where the subscriber accesses, port number of the subscriber interface board where the subscriber accesses, and MAC (Media Access Control) address information of the subscriber terminal.

Said step of converting the accessed subscriber location information into a code in the encoding format of the corresponding field in the packet to be sent outwards by the subscriber comprises:

the network access device converting the accessed subscriber location information into a code in the same encoding format as the MAC address carried in the packet to be sent outwards by the subscriber.

Said step of the network access device receiving the packet sent from the subscriber, replacing the corresponding field in the packet with the determined subscriber location information code, and transferring the packet in the network communication system comprises:

the network access device receiving the packet sent from the subscriber;

the network access device replacing the source MAC address information carried in the packet sent from the subscriber with the determined subscriber location information code, and sending the packet to the access server.

Said network access device is a broadband access device in a broadband network;

said access server is a BRAS (Broadband Remote Access Server) or a network device with BRAS function in a broadband network.

The method for transferring subscriber location information in a network communication system further comprises:

configuring a correspondence between the subscriber location information and the subscriber location information code in the broadband access device;

configuring a correspondence between the subscriber location information code and the physical subscriber location information in the broadband access server, or configuring a correspondence between the subscriber location information code and the subscriber location information in a Radius Server (remote authentication server).

The method for transferring subscriber location information in a network communication system further comprises:

replacing the destination MAC address in the packet to be sent by the network access device from its network-side port to the subscriber with the MAC address of the subscriber terminal, and then sending the packet to the subscriber.

Said step of converting the accessed subscriber location information into a code in the same encoding format as the MAC address carried in the packet to be sent outwards by the subscriber comprises:

the network access device encoding the subscriber location information into a 48-bit subscriber location information code in the encoding format of MAC address.

Said subscriber location information code comprises:

one or more indexes of broadband access device number, device frame number, slot number, and port number that are required to identify the subscriber location information;

one or more indexes of MAC address, priority, protocol encapsulation mode, subscriber type, and PVC (Permanent Virtual Connection) ID of the subscriber terminal that describe subscriber characteristics.

Said 48-bit subscriber location information code comprises:

24 bits, content determined by network access device manufacturers; 5 bits, index of MAC address and/or PVC ID of the subscriber terminal; 7 bits, index of the network access device ID; 7 bits, index of the access port number; and 5 bits, index of slot number of the subscriber interface board where the subscriber accesses.

Said subscriber location information encoding comprises:

mapping the subscriber location information to the subscriber location information code through direct mapping; or converging the subscriber location information to an intermediate variable ID, and then mapping the intermediate variable ID to the subscriber location information code.

In another aspect, the present invention provides a method for converting media access control (MAC) address, including the steps of:

a network access device generating a MAC address from the MAC address resource pool; and replacing the source MAC address in a packet from a subscriber with the generated MAC address.

The generated MAC address is unique.

In the method for converting MAC address, the step of generating a MAC address from the MAC address resource pool further includes the step of: generating the MAC address according to at least one of network access device ID in the network accessed by the subscriber, slot number of the subscriber interface board in the network access device where the subscriber accesses, and port number of the subscriber interface board where the subscriber accesses.

It can be seen from the technical solution provided in the present invention that the present invention achieves effective transmission of subscriber location information in the network communication system by carrying the port information and slot information of the network access device where the subscriber accesses as well as information of the network access device in the source MAC address field of the subscriber packet transferred in the network and transferring the subscriber packet to the access server. The method of the present invention is no longer restricted by the number of permitted VLAN IDs in the network, and thereby improves feasibility of acquisition of subscriber location information, providing a convenience for network operators to implement relevant extended services in network communication systems.

The present invention is especially adapted to broadband network communication systems, in which the broadband access devices can transfer location information (e.g., access port where the subscriber accesses) to BRAS devices through packets transferred in the network, so that the BRAS can, when processing PPPoE or other authentication protocols for the subscribers, process value-added services and network security, including theftproofing of account number, account number binding service, and physical tracing of hackers, etc. according to the subscriber location information.

DETAILED DESCRIPTION OF THE EMBODIMENTS

Hereunder the embodiments of the present invention are described with reference to the attached drawings.

Figure 2:
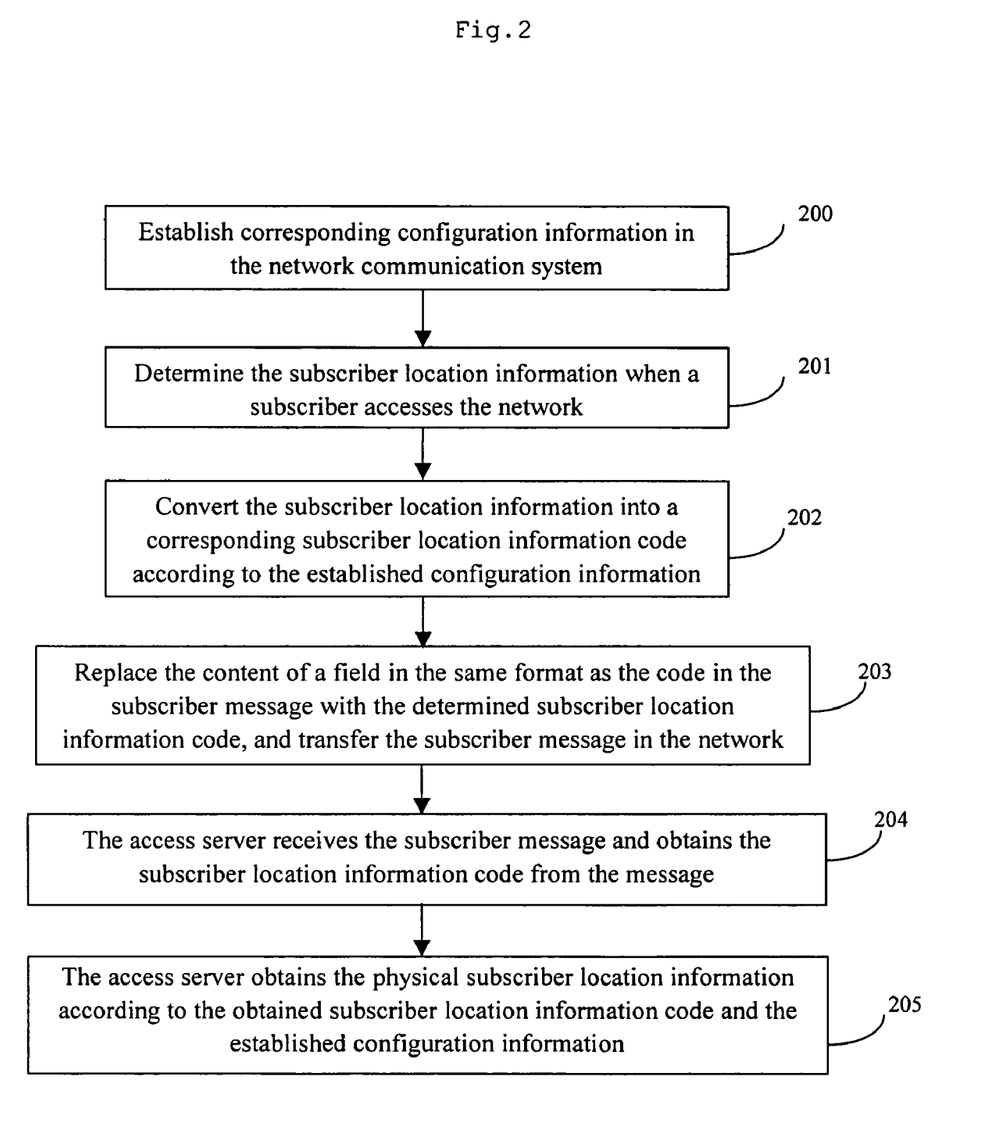
FIG. 2 is a flow diagram of an embodiment of the present invention.
Figure 3:
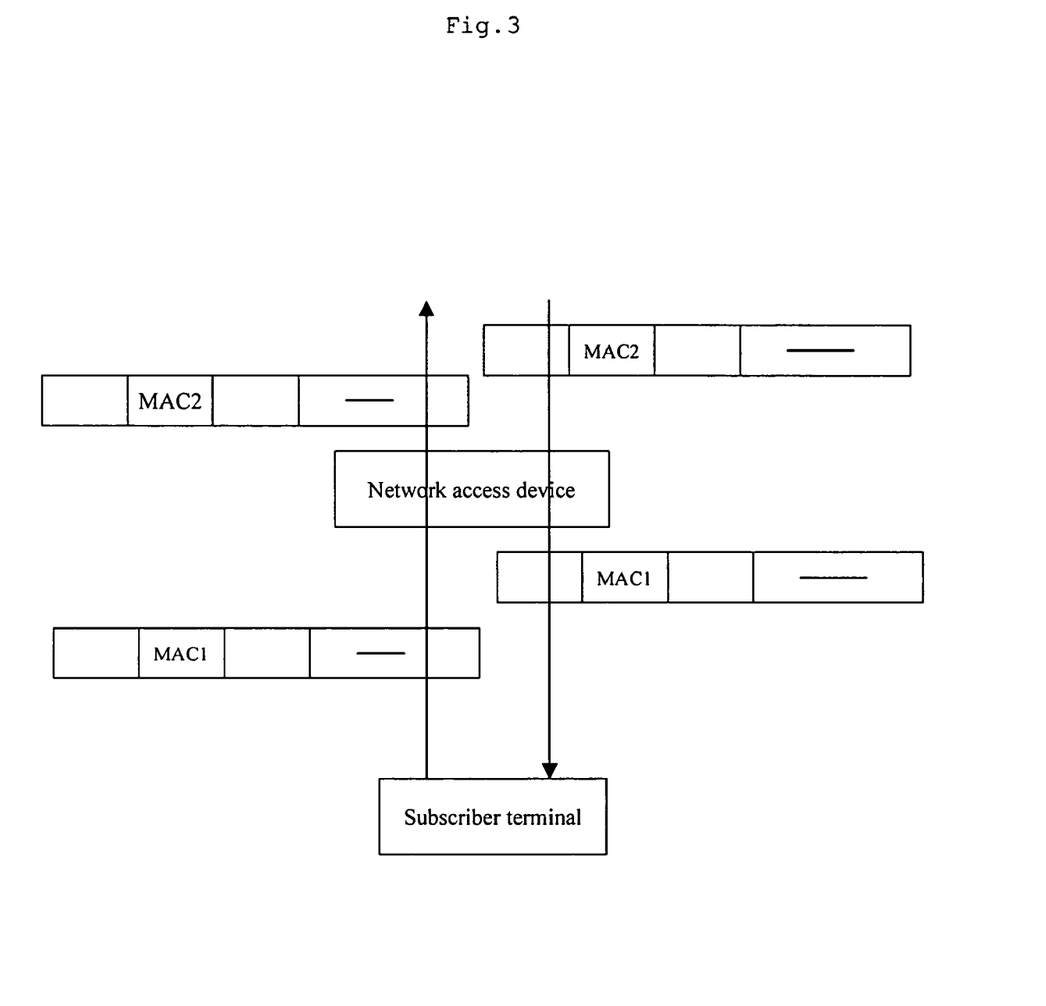
FIG. 3 is a schematic diagram of bearing subscriber location information in a packet as described in the present invention.

Referring to FIG. 2 and FIG. 3, the method for transferring subscriber location information in a network communication system of the present invention comprises the following steps:

step 200: performing configuration in the network communication system correspondingly, so as to implement transmission of subscriber location information, said configuration comprising:

configuring a correspondence between the subscriber location information and the subscriber location information code in the network access device, so as to convert the location information of the accessed subscriber into the corresponding subscriber location information code according to the configured correspondence, and transferring the same in the network communication system; in uplink direction, said correspondence records the correspondence between the subscriber location information (MAC address, port number, slot number of the subscriber terminal, etc.) and the subscriber location information code; in downlink direction, said correspondence records the correspondence between the subscriber location information code and the MAC address of the subscriber terminal; said subscriber location information code is in the same format as the content in a certain field of a subscriber packet, e.g., the subscriber location information code is in the same format as MAC address carried in a subscriber packet; said correspondence may be stored in a tabular form;

configuring a correspondence between the subscriber location information code and the subscriber location information in the access server or Radius Server (remote authentication server), so that the access server can determine the subscriber location according to the configured correspondence and the subscriber location information code carried in the packet when receiving the packet; said correspondence may also be stored in a tabular form.

The following steps can be executed after the configuration in step 200, so as to implement transmission of subscriber location information in the network communication system.

Step 201: determining the accessed subscriber location information when a subscriber accesses the network via an access device; said subscriber location information comprises: network access device ID in the network accessed by the subscriber, slot number of the subscriber interface board in the network access device where the subscriber accesses, port number of the subscriber interface board where the subscriber accesses, and MAC address information of the subscriber terminal; of course, as the network communication technology develops, the content of said subscriber location information may change as required by network communication; however, this will not affect determination of subscriber location information in this step;

step 202: after the accessed subscriber location information is determined, converting the subscriber location information into a corresponding subscriber location information code according to the correspondence table configured in the network access device in step 200, and executing step 203.

Step 203: replacing the content of a field in the same format as the code in the subscriber packet with the determined subscriber location information code, and transferring the resulted subscriber packet in the network, so that the access server that need obtain the subscriber location information can receive the subscriber packet and obtain the corresponding subscriber location information; for example, when said subscriber location information is in the same format as MAC address, it replaces the source MAC address in the source MAC address field in the subscriber packet with the determined subscriber location information code.

Step 204: when receiving the subscriber packet sent in step 203, the access server obtains the subscriber location information code from the corresponding field in the subscriber packet.

Step 205: during local authentication, the access server searches in the correspondence table configured in it in step 200 according to the obtained subscriber location information code, so as to obtain the location information of the subscriber; during Radius authentication, said location information code is transferred, through an authentication packet, to the Radius Server, which searches in the correspondence configured in it and thereby obtains the location information of the subscriber.

Through steps 200-205, the access server and Radius Server in the network communication system can obtain the subscriber location information successfully, so as to provide different kinds of value-added services with said subscriber location information, providing more convenience to operation and management of the network communication system.

In addition, since the processing steps 200-205 are added in the network communication system, the destination MAC address in the packet, that is received by the network access device and is to be sent to the subscriber terminal, is the subscriber location information code instead of the MAC address of the subscriber terminal; therefore, according to the present invention corresponding processing procedures have to be added in the network access device, so as to replace the destination MAC address in the packet to be sent to the subscriber terminal with the MAC address of the subscriber terminal, and obtain the information including slot number and port number corresponding to said MAC address, and finally perform sending of the packet; as shown in FIG. 3, MAC1 is the physical MAC address information of the subscriber terminal, while MAC2 is the subscriber location information code; MAC1 is replaced with MAC2 when the access device sends the subscriber packet; MAC2 is replaced with MAC1 when the access device sends the packet to the subscriber terminal.

The network access device described in the present invention may be a network access device directly connected with the subscriber end or an intermediate network access device for convergence, and configuration may be performed as required by the operating management of the network communication system in the corresponding network access device in actual application of the present invention.

Hereunder the embodiments of the present invention are further described provided an illustration of a broadband network communication system that is commonly used today.

In a broadband network, the subscriber interface boards in a broadband access device are provided with access interfaces for external subscribers; a different subscriber interface board can be provided with a different access mode, such as one of ADSL, VDSL, Ethernet, G.shdsl, etc.; a broadband access device is usually provided with a plurality of subscriber interface boards, which are numbered by slot number starting from 0 or 1; a subscriber interface board can be provided with a plurality of ports for subscriber access, e.g., 16, 24, 32, 48, etc., which are addressed centrally starting from 0 or 1, referred to as port numbers.

When accessing the broadband network via a subscriber access port in the subscriber interface board, a subscriber terminal sends an Ethernet packet in Ethernet format to the broadband access device, with the source MAC address in the packet message as MAC address of the subscriber terminal and the destination MAC address as MAC address of the next hop or the host.

The broadband access device creates a 48-bit subscriber location information code, according to the slot number and port numb of the subscriber interface board for the accessed subscriber, MAC address of the subscriber terminal and its own ID of the broadband access device, replaces the source MAC address in the subscriber packet with said subscriber location information code, and sends the packet to the broadband access server.

That is to say, any accessed subscriber connected to the subscriber interface board can be located accurately according to the slot number of the subscriber interface board and the port number of the subscriber interface board; in order to transfer the subscriber location information of the located subscriber to a BRAS device on the convergence layer or backbone layer, said information, along with the ID (or number) of the broadband access device and other information, have to be coded into a 48-bit subscriber location information code, which complies with the encoding format of MAC address in Ethernet, i.e.:

presently, the encoding format of MAC address is: XX.XX.XX.XX.XX.XX, 48 bits in all; wherein, the first 24 bits identify the manufacturer obtaining the MAC address field, which is determined by the broadband access device manufacturer and can't be modified randomly; the last 24 bits identify the address range managed by the manufacturer himself and can be modified as required;

The last 24 bits can be used as index codes, the index information of which:

include, but are not limited to: one or more of broadband access device number, device frame number, slot number, and port number, etc., required to identify subscriber location;

include, but are not limited to: one or more of MAC address of the subscriber terminal, priority, protocol encapsulation mode, subscriber type, and PVC (Permanent Virtual Connection) ID, etc., required to describe subscriber characteristics; said priority refers to a priority for packet transmission; said protocol encapsulation mode may be PPPoE, etc; said subscriber type may be a personal subscriber or a subscriber in a network cafe, etc.;

said index codes may be implemented with a HASH algorithm; For example, the HASH algorithm mapping may be: the toppest 5 bits are for extension, and may be used to index the source MAC address of the subscriber, some bits in PVC ID, or priority, etc.; the next 7 bits (can identify 128 devices) can be used as an index for the broadband access device ID; the intermediate 5 bits (can identify 32 slots) are used as an index for the slot number of subscriber interface board; the last 7 bits (can identify 128 ports) are used as an index for the port number of subscriber interface board; in this way, the subscriber location information is coded into 48 bits uniquely.

Of course, a more sophisticated "many bits to 24 bits" convergence HASH algorithm may be used; for instance, the information may be converged to intermediate variable IDs first and then mapped from the intermediate variable IDs to a 48-bit subscriber location information code.

When receiving the subscriber packet sent from the broadband access device, the broadband access server obtains the subscriber location information code from the packet and determines the location information of the subscriber according to the code.

In fact, in the present invention, the subscriber location information is carried in the MAC address to implement the transmission of subscriber location information.

Therefore, the present invention further provides a method for converting MAC address, including the steps of:

a network access device generating a MAC address from the MAC address resource pool; and replacing the source MAC address in a packet from a subscriber with the generated MAC address.

The generated MAC address is unique.

The step of generating a MAC address from the MAC address resource pool further includes the step of: generating the MAC address according to at least one of network access device ID in the network accessed by the subscriber, slot number of the subscriber interface board in the network access device where the subscriber accesses, and port number of the subscriber interface board where the subscriber accesses.

In a broadband access network, through such a MAC address conversion process, the subscriber location information code corresponding to the subscriber location information can be mapped to a specific MAC address, which can be transferred through the transport network to a traffic processing device including BRAS and a device with BRAS function on the convergence layer, or it can be transferred to a RADIUS (remote) subscriber management device or any other subscriber management device via a traffic processing devices; since said MAC identifies subscriber location information, the subscriber management device can manage the subscriber accordingly, such as authorization, authentication, accounting, right, service priority, etc.

The invention claimed is:

1. A method for transferring subscriber location information in a network communication system, comprising:

determining, by a network access device, the subscriber location information when a subscriber accesses the network, wherein the subscriber location information comprises an identifier of the network access device, a slot number of the subscriber interface board, and a port number of a port of the subscriber interface board in the network access device;

converting, by the network access device, the subscriber location information into a code in an encoding format of a content of a field in a packet sent from the subscriber;

replacing, by the network access device, the content of the field in the packet with the subscriber location information code, and transferring the packet in the network communication system, wherein said subscriber location information code comprises:

one or more indexes of broadband access device number, device frame number, slot number, and port number that are required to identify the subscriber location information;

an index of MAC address of the subscriber terminal;

an index of subscriber type of the subscriber terminal; and one or more indexes of priority and protocol encapsulation mode that describe subscriber characteristics.

2. The method for transferring subscriber location information in a network communication system according to claim 1, wherein said step of converting the subscriber location information comprises:
converting, by the network access device, the subscriber location information into the code in the same encoding format as a MAC address carried in the packet sent from the subscriber.

3. The method for transferring subscriber location information in a network communication system according to claim 2, wherein said step of replacing the content of the field in the packet with the subscriber location information code, and transferring the packet in the network communication system comprises:
replacing the MAC address carried in the packet sent from the subscriber with the subscriber location information code, and sending the packet to an access server in the network communication system.

4. The method for transferring subscriber location information in a network communication system according to claim 3, wherein
said network access device is a broadband access device;
said access server is a Broadband Remote Access Server, BRAS, or a network device with BRAS function in the broadband network.

5. The method for transferring subscriber location information in a network communication system according to claim 4, further comprising:
configuring a correspondence between the subscriber location information and the subscriber location information code in the broadband access device;
configuring a correspondence between the subscriber location information code and the subscriber location information in the broadband access server, or configuring a correspondence between the subscriber location information code and the subscriber location information in a Radius Server.

6. The method for transferring subscriber location information in a network communication system according to claim 3, further comprising:
replacing a destination MAC address in a packet, from the network-side port of the network access device, addressed to the subscriber with the MAC address of the subscriber terminal; and then sending the packet to the subscriber.

7. The method for transferring subscriber location information in a network communication system according to claim 2, wherein said step of converting the subscriber location information comprises:
encoding, by the network access device, the subscriber location information into a 48-bit subscriber location information code in the encoding format of the MAC address.

8. The method for transferring subscriber location information in a network communication system according to claim 7, wherein said 48-bit subscriber location information code comprises:
24 bits, content determined by network access device manufacturers; 5 bits, index of MAC address of the subscriber terminal; 7 bits, index of the network access device ID; 7 bits, index of the access port number; and 5 bits, index of slot number of the subscriber interface board where the subscriber accesses.

9. The method for transferring subscriber location information in a network communication system according to claim 1, wherein said subscriber location information encoding comprises:
mapping the subscriber location information to the subscriber location information code through direct mapping; or
converging the subscriber location information to an intermediate variable ID, and then mapping the intermediate variable ID to the subscriber location information code.

10. The method for transferring subscriber location information in a network communication system according to claim 1, wherein the subscriber location information further comprises a Media Access Control, MAC, address of a subscriber terminal.

11. The method for transferring subscriber location information in a network communication system according to claim 1, wherein the subscriber accesses the network via the port of the subscriber interface board.

12. A method for transferring subscriber location information in a network communication system, comprising:
determining, by a network access device, the subscriber location information when a subscriber accesses the network;
converting, by the network access device, the subscriber location information into a 48-bit subscriber location information code in an encoding format of a Media Access Control, MAC, address carried in a packet sent by the subscriber;
replacing, by the network access device, the MAC address in the message with the subscriber location information code, and transferring the message in the network communication system,
wherein said 48-bit subscriber location information code comprises: 5 bits, index of the MAC address of a subscriber terminal; 7 bits, index of an identifier of the network access device; 7 bits, index of a port number of a port through which the subscriber accesses the network; and 5 bits, index of a slot number of a subscriber interface board having the port, and
wherein converting the subscriber location information comprises:
converging the subscriber location information to an intermediate variable ID, and then mapping the intermediate variable ID to the subscriber location information code.

13. A network access device, comprising:
means for determining a subscriber location information when a subscriber accesses the network;
means for converting the subscriber location information into a code in an encoding format of a content of a field in a packet from the subscriber;
means for replacing the content of the field in the message with the subscriber location information code, and transferring the message in the network communication system;
wherein the subscriber location information comprises an identifier of the network access device, a port number of a port of a subscriber interface board in the network access device, a slot number of the subscriber interface board, and a Media Access Control, MAC, address of a subscriber terminal; wherein the subscriber accesses the network via the port of the subscriber interface board,
wherein said subscriber location information code comprises:
one or more indexes of broadband access device number, device frame number, slot number, and port number that are required to identify the subscriber location information;
an index of MAC address of the subscriber terminal;
an index of subscriber type of the subscriber terminal; and
one or more indexes of priority and protocol encapsulation mode that describe subscriber characteristics.

* * * * *

UNITED STATES PATENT AND TRADEMARK OFFICE
CERTIFICATE OF CORRECTION

PATENT NO. : 7,698,466 B2
APPLICATION NO. : 10/555722
DATED : April 13, 2010
INVENTOR(S) : Haijun Wu and Xiaolin Xu It is certified that error appears in the above-identified patent and that said Letters Patent is hereby corrected as shown below:

Title page of patent, replace "(87) PCT Pub. No.: WO2004/066589" and "PCT Pub. Date.: Aug. 5, 2004" with "(87) PCT Pub. No.: WO2004/100574" and with "PCT Pub. Date.: Nov. 18, 2004".

Signed and Sealed this

First Day of June, 2010

David J. Kappos
*Director of the United States Patent and Trademark Office*